G. LISTER.
CHIMNEY POT, FLUE TOP, AND THE LIKE.
APPLICATION FILED OCT. 1, 1918.

1,312,996.

Patented Aug. 12, 1919.
2 SHEETS—SHEET 1.

INVENTOR:
George Lister
By Wm Wallace White
ATTY.

G. LISTER.
CHIMNEY POT, FLUE TOP, AND THE LIKE.
APPLICATION FILED OCT. 1, 1918.

1,312,996.

Patented Aug. 12, 1919.

INVENTOR:
George Lister
By Wm Wallace White
ATTY.

UNITED STATES PATENT OFFICE.

GEORGE LISTER, OF TOW LAW, ENGLAND.

CHIMNEY POT, FLUE-TOP, AND THE LIKE.

1,312,996. Specification of Letters Patent. Patented Aug. 12, 1919.

Application filed October 1, 1918. Serial No. 256,459.

*To all whom it may concern:*

Be it known that I, GEORGE LISTER, of Thornley Terrace, Tow Law, in the county of Durham, England, engineer, a subject of the King of Great Britain and Ireland, have invented certain new and useful Improvements in or Relating to Chimney Pots, Flue-Tops, and the like, of which the following is a specification.

This invention relates to chimney pots, flue tops, and the like. The object of this invention is to provide an improved chimney pot or the like to prevent down drafts.

A chimney pot or flue top made in accordance with this invention is tapered from the base to the orifice. The upper portion is or may be tapered more rapidly than the lower portion.

A plurality of tapered ducts are provided having inlets disposed around the outside of the top of the pot adapted to convey air downwardly and to discharge it in an upward direction inside the pot some distance below the top.

A plurality of tapered ducts are also provided having inlets disposed around the outside of the pot near the base of the pot adapted to discharge air in an upward direction inside the pot.

The holes are or may be flattened or elliptical in cross section.

Referring to the drawings filed herewith:

Figure 1:
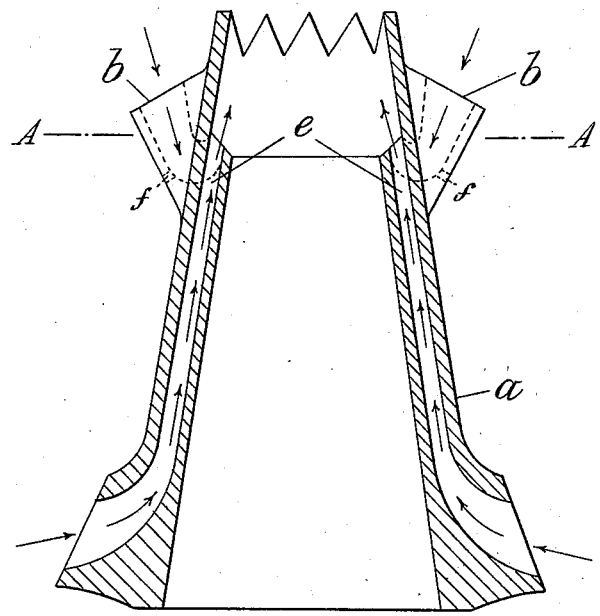
Figure 1 is a sectional elevation of one form of chimney pot made in accordance with this invention.
Figure 2:
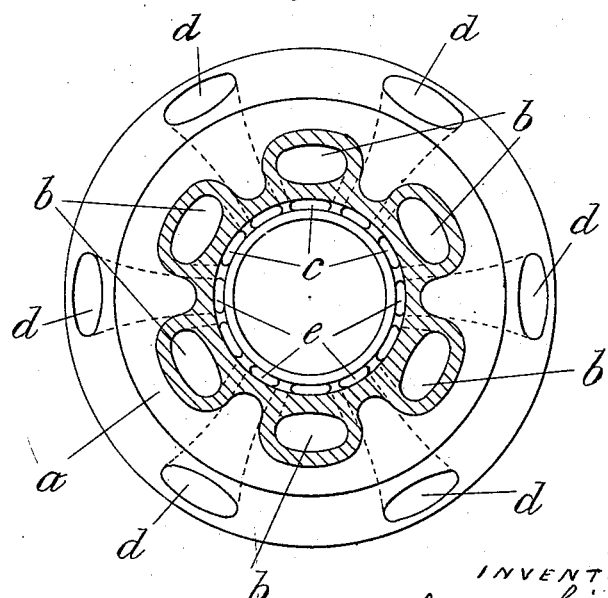
Fig. 2 is a plan.

The chimney pot as shown in Figs. 1 and 2, is made with a tapered wall *a* and is provided with flues having inlets *b b b* near the top discharging in an upward direction at *c c c* within the pot.

Near the base of the pot are the inlets *d d d* of other flues discharging air at *e e e* in an upward direction within the pot. *f f* are holes to drain off any water which may collect in the ducts.

Figure 3:
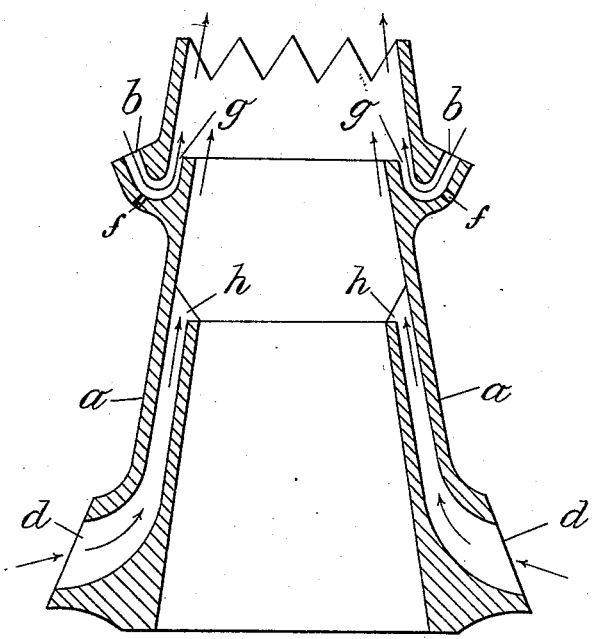
Fig. 3 is a section of a modified construction.

In the form shown in Fig. 3, the air inlets at the top of the pot and the air inlets at the bottom of the pot have separate discharge orifices into the pot. The upper inlets discharge into the pot at *g* and the lower inlets discharge into the pot at *h*. The pot may be provided with a top which may be in one with or detachable from the pot.

The chimney pot may be of clay, cement, or metal, and may be of round, octagonal or other suitable cross section.

With a chimney pot or flue top made in accordance with this invention, down draft is prevented, the updraft is increased, no matter in which direction the wind blows.

Although one ring of tapered ducts are shown in the drawings to convey air downwardly and discharge in an upward direction in the pot, more than one ring of ducts may be provided.

What I claim and desire to secure by Letters Patent is:—

A chimney pot tapered from the base to the top and provided with a plurality of ducts having inclined inlets disposed around the outside of the top of the pot to admit air blowing downwardly and to discharge the same in an upward direction within the pot, and a second plurality of ducts having inlets disposed around the outside of the pot and oppositely inclined with relation to the inlets of the first mentioned ducts to admit air blowing horizontally or upwardly and to discharge the air in an upward direction within the pot, the outlets of all of said ducts terminating in the same horizontal plane.

In testimony whereof I have signed my name to this specification.

GEORGE LISTER.

Witnesses:
W. RUSSELL,
A. CAMERON.

Copies of this patent may be obtained for five cents each, by addressing the "Commissioner of Patents, Washington, D. C."